Jan. 4, 1927.  
J. F. WHITE  
1,613,148  
AUTOMOBILE RADIATOR ATTACHMENT  
Filed August 23, 1926
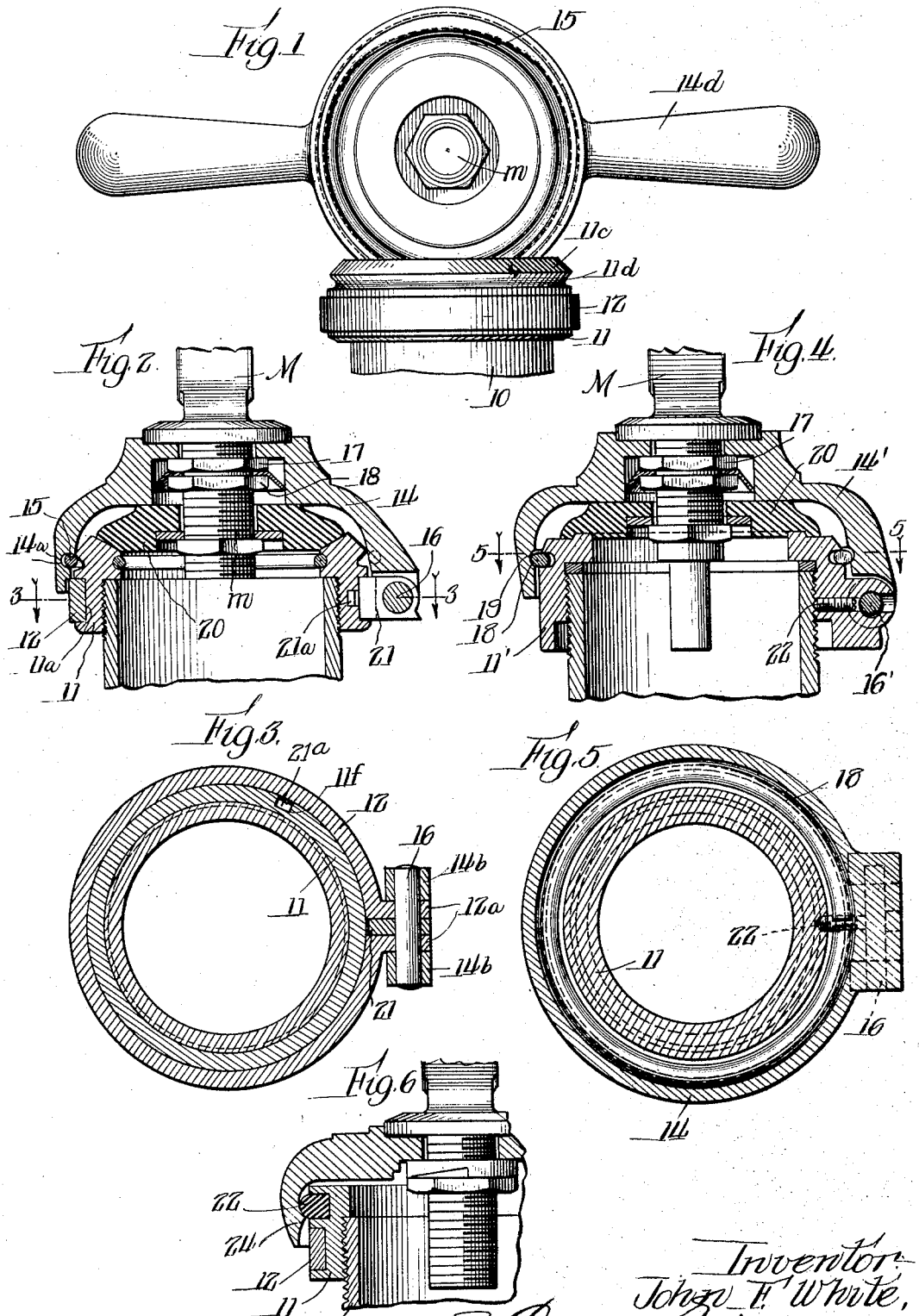

Patented Jan. 4, 1927.

1,613,148

UNITED STATES PATENT OFFICE.

JOHN F. WHITE, OF CHICAGO, ILLINOIS, ASSIGNOR TO WHITE PRODUCTS COMPANY, OF CHICAGO, ILLINOIS, A CORPORATION OF ILLINOIS.

AUTOMOBILE RADIATOR ATTACHMENT.

Application filed August 23, 1926. Serial No. 130,864.

This invention relates to caps or attachments for automobile radiators, of the type designed to function as a closure for the radiator spout or filling tube and as a retaining mounting for a display device such as an ornament or an indicating instrument. The present application constitutes a continuation in part of each of my co-pending applications Serial Nos. 754,257, filed Dec. 6, 1924 and 6,164, filed February 2, 1925.

A general object of the invention is the provision of such an attachment adapted for mounting on various standard forms of radiator spouts without requiring any special forming or modification of the latter.

Another object is the provision of such a device which is specially adapted for merchandising as an accessory sold apart from the automobile itself, by virtue of the fact that a standard or uniform type of cap may be employed on various types of radiator spouts, either internally or externally threaded, through the use of appropriate connecting members which are interchangeable in the assembly of the device.

Another object is the provision of such an attachment which is adapted to retain the display device in the proper position on the automobile, and which lends itself to embodiment in decorative designs.

A further object is the provision of such a device which is qualified to form a tight closure for the filling tube yet permit opening or uncovering of the latter, with facility, for the inspection or filling of the radiator.

A further object is the simplification of construction of attachments of the sort specified.

Other and further objects will be pointed out or indicated hereinafter or will appear to one skilled in the art upon an understanding of the invention or its employment in use.

In the drawing forming a part of this specification I illustrate certain embodiments of the invention, but it is to be understood that the appended claims are not to be construed as limited only to these forms.

In the drawing,

Fig. 1 is a view illustrating the upper portion of a radiator filling spout with the attachment in place and the cover swung back to open position;

Fig. 2 is a sectional elevation of one form of device, same taken on a diameter;

Fig. 3 is a cross section of the same form taken on line 3—3 of Fig. 2;

Fig. 4 is a similar sectional elevation of another form of device;

Fig. 5 is a cross section of same on substantially line 5—5 of Fig. 4; and

Fig. 6 is a part sectional elevation of a third form.

The nature of the invention may be ascertained immediately by an understanding of the illustrative embodiments shown. As designated by reference characters, let it be understood that 10 is the upper portion of the automobile radiator filling spout to which the device is to be attached. The form illustrated in Figs. 1, 2 and 3 comprises a bushing or adapter 11 which is properly formed, as with screw threads, for seating upon the radiator nipple. The adapter is formed with a circumferential groove $11^a$ in which is rotatably seated a ring member 12. This ring member is split and formed at its ends with the outwardly directed lugs $12^a$ in which is seated the pintle 16 upon which is mounted, for hinged movement, the cap 14. This cap has the ears $14^b$ which receive the pintle and which also embrace laterally the lugs $12^a$ to hold the ring 12 in assembled connection with the adapter 11. The cap 14 is shaped so as to swing down in covering relationship over the upper end of the bushing 11, and is provided with an axial aperture which accommodates the mounting stem $m$ of a display device M, which is secured in the cap by the nuts 17 and 18. Mounted on the stem $m$ is a sealing gasket 20 which is adapted to seat upon the upper edge of the bushing 11 to form a tight sealing closure for the radiator nipple. A retaining member 21 is provided for preliminarily holding the ring 12 against rotation on the bushing 11, said retaining member having a weakened projection $21^a$ seated in a notch $11^f$ of the bushing 11, the retaining member being mounted on the pintle 16. The cap is provided with laterally extending handles $14^d$, which form ornamental features and also affords means whereby the device may be screwed into seated position on the radiator nipple. In such operation the bushing 11 is held against rotation in the cap and ring by the retaining member 21, but when screwed fully home, so that the bushing is firmly bound or seated on the nipple, further rotation of the cap through the instrumentality of the handles will operate to shear off the projection 21ª from the retaining member 21, thus leaving the ring 12 and cap free for rotation on the bushing 11. Consequently the bushing cannot be backed off from the nipple by rotation of the cap.

As a means for retaining the cap in its closed position, there is seated in a groove 14ª of the skirt portion of the cap, a spring ring or latching member 15, having portions projecting from the groove, and the bushing 11 is provided with a peripheral groove 11ᵈ, above which is a wedging surface 11ᶜ. As the cap is swung to closed position and pressed down, the pressure of the latching ring 15 against the surface 11ᶜ will wedge the projecting portions of the former outwardly, and when the cap reaches closed position the resilient ring will snap into the groove 11ᵈ, thus latching the cap in closed position. The upper wall of the groove 11ᵈ is cut on a proper bevel such that by application of sufficient pressure tending to raise the cap, the latching ring will be cammed out of the groove and permit the cap to open. When in closed position, the sealing gasket 20 is held firmly seated against the top of the bushing 11 so as to maintain a tight seal.

In the form illustrated in Figs. 4 and 5, the adapter 11' is threaded to screw on to the radiator nipple and the cap 14' is hinged directly to the adapter by a pintle 16' which is driven into a blind end seat so that it cannot be driven out from the opposite end. The bushing is tapped at a point intersecting the pintle seat for reception of a set screw 22 which is set up against the nipple after the adapter has been properly positioned thereon, to hold it against removal, which operation is effected before the pintle 16' is driven home. After the pintle is driven into place it prevents removal of the set screw 22. The adapter 11' is provided with a peripheral slot in which is seated a flattened spring ring 18, the marginal portions of which project beyond the adapter. The cap is formed with an internal groove 19 adapted to receive a projecting portion of the ring when the cap is in closed position to effect the latching of the latter. As the cap is swung to closed position, the portion over the hinge first engages the spring ring and slides it forwardly in its groove, and then the closing movement of the cap gradually constricts the ring until it snaps into the groove 19. Due to the extent of the ring, this is accomplished with but little exertion upon the cap, yet when in closed position the cap is securely retained by the ring due to the extensive bearing area between them. The opening of the cap is likewise readily accomplished by the application of pressure tending to swing it upwardly, by which operation the ring is cammed out of the groove 19 by the sloping lower wall portion of the latter.

In the form illustrated in Fig. 6, a firm elastic sealing ring 22 is seated in a peripheral groove in the adapter and projects peripherally thereof for sealing engagement with the inner wall of the skirt portion of the cap. On the side opposite the hinge, the cap is provided with the inwardly projecting ledge 24 which compresses the sealing ring as the cap is swung to closed position and after passing the ring engages under the projecting portion of the latter, latching the cap closed.

In either form of the device adapters threaded for different designs of radiator spouts may be employed with the same cap. No modification of the nipple is required, as the device is simply screwed into position in the customary fashion of a radiator cap. In the form illustrated in Figs. 4 and 5, the adapter, of course, must be seated in the proper rotational position on the nipple to place the hinge at the desired point, but in the other two forms the cap has free rotation on the adapter and may be placed at the desired rotational position without concern as to the point at which the adapter is stopped in the attaching operation. The engagement of the latching means with the adapter and the cap is effective to hold the latter against displacement from the proper rotational position by the vibration of the automobile.

What I claim is:

1. A radiator cap comprising a stationary adapter, a hinged rotatable portion thereon and means for releasably latching said hinged portion in any position permitted by its rotation to said adapter, said last named means being operable between the hinged portion and the adapter.

2. A radiator cap comprising a stationary adapter, a closure member thereon, and means for releasably latching said closure member to the adapter, said last mentioned means comprising a spring ring operable between the adapter and closure.

3. A device of the character described comprising a tubular member, a closure member hinged to one end of said tubular member, one of said members having a groove therein, the other member having a cam surface in operative relation to said groove, and a spring ring positioned in said groove to engage the said cam surface for holding the closure member in closed position.

4. A radiator cap comprising a stationary adapter, a cap secured to the adapter for closing the end thereof, and a spring ring operable between the adapter and cap for releasably latching the latter in closed position.

5. An automobile radiator attachment comprising a tubular adapter, a closure member connected therewith and movable to and from closed position thereon, one of said members having a groove therein, a spring ring positioned in said groove, and the other of said members having a latching portion for engagement with the spring ring to latch the cap in closed position.

6. An automobile radiator attachment comprising a tubular adapter member and a cap member connected therewith and movable to and from closing position thereon, one of said members having a groove, a flattened spring ring seated in said groove, the other of said members having a portion for engagement with the spring ring to latch the cap in closed position.

In testimony whereof I have hereunto subscribed my name.

JOHN F. WHITE.